2,966,442
ANTIBIOTIC COMPOSITIONS

William F. Elias, West Chester, Howard Joseph Merrion, Malvern, and Joseph K. Apat, West Chester, Pa., assignors to American Home Products Corporation, New York, N.Y., a corporation of Delaware No Drawing. Filed Sept. 20, 1956, Ser. No. 610,881

6 Claims. (Cl. 167—65)

This invention relates to antibiotic compositions and more particularly to penicillin compositions for therapeutic use.

The prior art has long sound a penicillin composition for therapeutic use which would yield substantial blood levels and for prolonged periods of time. It has been recognized that for every microorganism susceptible to penicillin there is a concentration of drug that kills bacteria and more penicillin would not destroy the organism with any greater rapidity. In one case, an excessive amount of penicillin actually slowed down the anti-bacterial activity. The search has therefore been in general more towards finding a prolonged effect rather than seeking still greater levels of penicillin concentration in the blood.

However, it is also recognized that for an immediate therapeutic effect, a substantial blood level is desirable and if this can be combined with a long-acting prophylaxis, a highly desirable product or composition would be obtained. To obtain this effect, it was decided to combine a sparingly water-soluble penicillin salt with a substantially more water-soluble salt of penicillin.

Compositions included within the scope of the invention not only showed the initial high blood levels produced by the more water-soluble element of the composition, but also retain a long duration of action. In addition, the compositions possessed changed and unexpectedly improved characteristics of lowered viscosity and ease of aspiration into, and ejection from, a hypodermic syringe of the type usually used for parenteral work.

Among the sparingly water-soluble salts of penicillin known to the art is that of N,N'-dibenzylethylenediamine-dipenicillin G (DBED-penicillin) disclosed and claimed in the patent of Szabo and Bruce, No. 2,627,491, dated February 3, 1953. In order to improve the blood levels of this particular penicillin salt, it was decided to combine it with procaine penicillin G or di-($\alpha$-methylbenzyl)ethylenediamine-dipenicillin which are substantially more water-soluble. The combination resulted in an improved initial blood level followed by prolonged action of the diamine penicillin salt but the product when reconstituted with water was viscous, foamy and aspiration into a hypodermic syringe was difficult. No improvement was achieved when other components were added as, for example, sodium citrate or sodium carboxymethylcellulose, as suggested and taught by the prior art, notably Macek, Patent No. 2,650,217.

It was found that the essential difficulty was in the character of the N,N'-dibenzylethylenediamine-penicillin salt used in the compositions. When such a product was made in accordance with the specific examples of the aforesaid Szabo and Bruce patent, the product appeared to be either amorphous or needle-like in form and was very fluffy. On suspension of this compound in water at 200,000 units potency or higher, either alone, or when combined with the substances previously mentioned, it made an unsatisfactory aqueous product from a commercial standpoint.

The same unsatisfactory situation was found with N,N'-dibenzylethylenediamine-dipenicillin G whenever this compound was obtained in predominantly amorphous, needle-like or acicular form. If this penicillin salt is recrystallized out of typical organic solvents as, for example, acetone, alcohol, benzene, etc., except formamide, one obtains mainly needle-like crystals. The latter also cannot be avoided when the base or a salt thereof is reacted with penicillin or a salt thereof in a solvent that does not comprise formamide in substantial amount.

When the aforesaid diamine salt is in the form of elongated needles, it cannot well be used as such in an injection composition because hypodermic needle blockage often results. To overcome this difficulty, it is necessary to pulverize or micronize the salt to a particle size from about 5 to about 150 microns. When this is done, a new difficulty develops in that when water is added, the product becomes excessively viscous, frothy and hard to aspirate into or extrude from a hypoderic syringe.

It was discovered that an alkaline penicillin salt as, for example, an alkali or alkaline earth metal salt of penicillin, more particularly a sodium, potassium or calcium penicillin salt, was a critical element regardless of whether the penicillin moiety was penicillin G or other penicillins such as penicillin V. When such a salt or mixture of salts was added to the diamine salt, the product was no longer viscous and was easily aspirated into and extruded from the hypodermic syringe. These new characteristics were evident in compositions containing either the particular diamine alone as the penicillin salt or when the latter was combined with other sparingly soluble penicillin salts as, for example, procaine penicillin, or other elements such as a buffering agent as, for example, sodium citrate, or a suspending agent as sodium carboxymethylcellulose, methylcellulose, etc.

The minimum amount of alkali or alkaline earth metal salts of penicillin needed to achieve the advantages mentioned hereinabove may be in the neighborhood of about 0.1–0.5 part of alkaline salt to 1 part of diamine salt. Obviously one may use a higher ratio, namely, more alkaline salt, depending on the potency desired for the dose administered. On the other hand, one might not be interested in obtaining initial high blood levels but desire only a satisfactory diamine produce per se, in which case the minimum amount of alkaline salt to give a viscosity-reducing effect would be indicated.

The new compositions of the invention may be used either orally or parenterally. In either case they may be in dry form for reconstitution and immediate use, or already in fluid form as a suspension. Where liquid suspensions are prepared, these may involve either an oleaginous or aqueous suspension. Where an oleaginous vehicle is used, it may involve on or more vegetable oils with peanut oil or sesame oil being preferred.

Whether the vehicle is either oleaginous or aqueous, it is often desirable to utilize a suspending agent although this is not always a necessity. Where oleaginous compositions are deemed desirable, a suitable suspending agent may be either beeswax, hydrogenated vegetable oil or alluminum monostearate. In the case of aqueous vehicles, suitable suspending agents are such hydrophilic agents as the natural gums such as, gum arabic, gum tragacanth, gum karaya, pectin, gelatin, agar, dextrin, etc, or the synthetic hydrophilic suspending agents which are more preferred, namely, salts of carboxymethylcellulose, methylcellulose, polyvinylpyrrolidone, or dextran. When referring to polyvinylpyrrolidone, the material meant is that disclosed in the publication of that name dealing with its preparation, properties, and applications, published 1951 by General Aniline and Film Corp., Development Dept., New York, New York. Of course, the suspending agents utilized should be substantially inert and non-toxic in the amounts used in the compositions.

When considering parenteral or liquid oral compositions in addition to the penicillin salt and suspending agent or agents, it has been found useful to have a stabilizer or buffering agent present in order to extend the shelf life, and a preservative to inhibit bacterial or fungal action. Benzyl alcohol, sodium benzoate as well as the alkyl-p-hydroxy-benzoates are useful preservatives, while suitable buffers or stabilizers for penicillin are $CaCO_3$, various mixed phosphate buffers or any of the buffers described in the Alburn et al. Patent No. 2,438,-106, issued March 23, 1948. Likewise, if additional properties are desired, one may coat the penicillin particles with a wetting agent such as lecithin to increase the wetting characteristics of the penicillin salt, and also, if desired, emulsifiers, surface-active and defoaming agents may be added as, for example, various partial higher fatty acid esters of sorbitan or polyoxyalkylene derivatives thereof known as Spans or Tweens, aryl alkyl polyether alcohols or salts thereof known as Tritons, the dialkyl esters of sodium sulfosuccinic acid known as Aerosols, etc. Parenteral compositions may also have a substance to render the composition isotonic, for example, sodium chloride. For oral suspensions, suggested additives are coloring, sweetening and flavoring agents where infant acceptability is sought.

For an oleaginous or aqueous suspension for parenteral use, the particle size of the penicillin salts may range from about 5 to about 150 microns with 95% of the particles preferably being less than about 10 microns in size and with about 50% of the particles having a particle size from about 8 to 10 microns. When considering a dry admixture to be re-constituted with water at the time of use, particle sizes may range from about 5 to 150 microns with at least 50% of the particles presumably having a size of about 20 to 40 microns. For oral compositions of the aqueous type the particle sizes are substantially the same as those indicated for the aqueous parenteral suspensions.

The following examples are given for a specific illustration of various compositions of the invention. It should be understood that these examples are essentially for illustrative purposes and are not to be considered limitative of the invention.

*Example 1*

A composition was made up containing the following ingredients:

Dibenzylethylenediamine penicillin G (pulverized, lecithin coated)_____units__ 300,000
Potassium penicillin G (pulverized), 1587 units per mg. _____do____ 100,000
Anhydrous sodium citrate, U.S.P. _____mgs.__ 3

This mixture is blended for one hour and is then pulverized and screened. The diamine penicillin is pulverized to a maximum size of about 150 microns with the average having a size of about 20 to 40 microns. The potassium penicillin is pulverized to approximately 70 micron size. Mixing and blending is continued for an additional hour and the final mixture is then treated with ethylene oxide to insure sterility.

The above composition when added to 1 cc. of water or physiological saline solution yields approximately 400,000 Oxford units/cc. which may be administered intramuscularly with a 22 gauge (Stubbs) needle into humans or animals.

*Example 2*

A therapeutic composition for injectable purposes was made up in the following manner:

Dibenzylethylenediamine dipenicillin G (80% pulverized) (20% micronized)_____units__ 300,000
Potassium penicillin G _____do____ 100,000
Sodium carboxymethylcellulose _____mgs.__ 3
Sodium citrate _____mgs.__ 3

The above composition was blended and treated in the manner disclosed in Example 1. This composition when reconstituted with an aqueous vehicle formed a suspension also suitable for human or veterinary use.

*Example 3*

A therapeutic composition in dry form suitable for later reconstitution with water was made up with the following formulation:

Dibenzylethylenediamine dipenicillin G (DBED-penicillin) (micronized, lecithin coated) _____units__ 2,000,000
Potassium penicillin G (pulverized)__do____ 1,000,000
Sodium citrate, U.S.P. (anhydrous, sterilized) _____mgs.__ 50

The mixture is blended as in the manner indicated above and sterilized with ethylene oxide. This dry, stable material is filled into vials to provide a therapeutic preparation for parenteral use which when added to 8.5 cc. water yields a dosage unit of about 200,000 units of DBED-penicillin.

*Example 4*

A composition somewhat similar to that disclosed in Example 3 was made up in the following manner:

Dibenzylethylenediamine dipenicillin G (100% micronized) _____units__ 2,000,000
Procaine penicillin G (100% pulverized) _____do____ 1,000,000
Potassium penicillin G _____do____ 1,000,000
Sodium citrate _____mgms. 50

This mixture is blended and sterilized as in the foregoing example and is to be reconstituted with 8.5 cc. of water for injection to yield a dosage unit of approximately 200,000 units DBED-penicillin.

*Example 5*

A therapeutic composition in dry form suitable for reconstitution with water for aqueous injection was made up in the following manner:

Dibenzylethylenediamine dipenicillin G (pulverized, lecithin coated)_____units__ 300,000
Di-(alpha-methylbenzyl)ethylenediamine dipenicillin G (pulverized, lecithin coated)__do____ 100,000
Potassium penicillin G (pulverized)____do____ 100,000
Sodium citrate, U.S.P. (anhydrous, sterilized) mgs__ 3

The above mixture was blended for about an hour and then pulverized and screened. Following the comminution the mixture was treated for sterilization.

On reconstitution with 1 cc. physiological saline, the composition may be administered intramuscularly through any standard glass syringe equipment with a 22 gauge needle. This composition is also suitable for human or veterinary use.

*Example 6*

A therapeutic parenteral product was prepared in the following manner:

N,N' - dibenzylethylenediamine dipenicillin G (micronized needles) _____units__ 5,000,000
Potassium penicillin G (pulverized) __do____ 1,000,000
Sodium citrate _____mg.__ 50
Water for injection _____cc.__ 7.0

*Example 7*

A therapeutic product for parenteral use was prepared as follows:

N,N' - dibenzylethylenediamine dipenicillin G units__ 5,000,000
Procaine penicillin G _____do____ 1,000,000
Potassium penicillin G _____do____ 1,000,000
Sodium citrate _____mg.__ 50
Water for injection _____cc.__ 7.0

Other combinations of the alkylenediamine penicillin, procaine penicillin, and potassium penicillin salts are contemplated as falling within the scope of the invention. Thus, as another example, one may provide a dry admixture of these salts so that on addition of sterile water, each cubic centimeter of the composition, suitable for injection, would contain at least 150,000 units of N,N'-dibenzylethylenediamine dipenicillin, about 150,000 units of the procaine penicillin and about 100,000 units of potassium penicillin.

*Example 8*

A therapeutic composition was made up in the following manner:

| | |
|---|---:|
| N,N'-dibenzylethylenediamine dipenicillin G units__ | 5,000,000 |
| Potassium penicillin V _____do____ | 1,000,000 |
| Sodium citrate _____mg.__ | 50 |
| Water for injection _____cc.__ | 7.0 |

The following compositions were prepared essentially to achieve a viscosity-reducing and utilizable acicular type of N,N'-dibenzylethylenediamine G without necessarily seeking a higher blood level.

*Example 9*

| | |
|---|---:|
| DBED-dipenicillin G (micronized needles) units__ | 2,000,000 |
| K-penicillin G _____do____ | 200,000 |
| Sodium citrate _____mg.__ | 50 |
| Water for injection _____cc.__ | 8.5 |

*Example 10*

| | |
|---|---:|
| DBED-dipenicillin G (micronized needles) units__ | 2,000,000 |
| Na-penicillin G _____do____ | 300,000 |
| Sodium citrate _____mg.__ | 50 |
| Water for injection _____cc.__ | 8.5 |

*Example 11*

| | |
|---|---:|
| DBED-dipenicillin G (micronized needles) units__ | 5,000,000 |
| Ca-penicillin G _____do____ | 1,000,000 |
| Sodium citrate _____mg.__ | 50 |
| Water for injection _____cc.__ | 8.5 |

*Example 12*

| | |
|---|---:|
| DBED-dipenicillin G (micronized needles) units__ | 2,000,000 |
| K-penicillin V _____do____ | 500,000 |
| Sodium citrate _____mg.__ | 50 |
| Water for injection _____cc.__ | 8.5 |

Micronization of the crystals of penicillin is carried out by comminuting the penicillin salt with an air blast under pressure, causing fragmentation to particle sizes in general ranging from about 5 to 20 microns, but usually less than about 10 microns. Pulverization involves comminution with hammer impact device causing a fragmentation to relatively larger sizes normally ranging upward of about 20 microns in size.

As indicated in the above examples, suitable compositions may be made up with or without suspending agents although it is preferred that these be present and more preferably that the compositions contain carboxymethylcellulose as the major suspending agent. The amount of this material that may be used in the above formulations may range up to about 1.0% by weight. For polyvinylpyrrolidone one may use up to about 1.5%; agar may be used up to about 0.5%; dextrin, dextran, and gum acacia up to about 8.0%; gum karaya or carrageen gel may be used up to about 2.0%; methylcellulose of the 1500 CPS type, pectin and tragacanth may be used up to about 1% also. Gelatin is useable up to about 4% and sodium alginate up to about 0.8% may be used.

The stabilizer content may also be varied within the skill of the art and in the preceding formulations, sodium citrate and potassium citrate may range in amount from 0.5% to about 5% by weight. Sodium phosphate, monobasic or dibasic, is also effective and may be used in an amount ranging from about 0.05% to about 2%.

With regard to wetting agents, the well-known sorbitans and the polyoxyalkalene derivatives may be used. These comprise particularly the monolaurate, monopalmitate, the monostearate and the monooleate. These may be used in an amount ranging from about 0.05% to about 0.3%. Where lecithin is added to the suspension, this material may be used in a range of about 0.1% to 3%, while as a coating on the penicillin the amount would be from about 0.5% to 6% by weight.

Where preservatives are utilized, these may comprise either phenol, benzyl alcohol, sodium benzoate or the lower alkyl p-hydroxybenzoates. The phenol may comprise about 0.25% to 0.5% by weight. The benzyl alcohol and sodium benzoate ranging from about 0.5% to 1% by weight, the methyl benzoate ranging from 0.12% to 0.25% while the propyl and butyl benzoate range from approximately 0.013% to about 0.05% by weight.

In the oral compositions, one may utilize any flavor or color or any sweetening agent, such as, sucrose, sucaryl or saccharin. Thus, the range for sucrose may be from 5% to 30% by weight and for sucaryl or saccharin from 0.5 grain to 4 grains.

All of the above percentages should be understood to be on a weight per unit of volume basis, as for example in grams per 100 cc. of product.

The compositions of the invention as specifically described are not excessively viscous or foamy and produce exceptionally long blood levels with initially high therapeutic effect. This application is a continuation-in-part of application Serial No. 344,222, filed March 23, 1953, now abandoned.

We claim:

1. A therapeutic composition comprising the penicillin G salt of N,N'-dibenzylethylenediamine, said salt originally having an appearance selected from the type consisting of amorphous and needle-like forms, and being in finely divided form, with at least about 50% of the particles having a size ranging from about 5 to about 40 microns, combined with a water-soluble penicillin salt of the group consisting of alkali metal and alkaline earth metal penicillin, in a ratio, water-soluble salt to diamine salt, of at least about 0.1:1.

2. The composition of claim 1; wherein the water-soluble salt is potassium penicillin.

3. The composition of claim 1; wherein a synthetic, hydrophilic suspending agent is combined with the therapeutically active ingredients.

4. The composition of claim 3; wherein water is an additional component of the composition.

5. A therapeutic composition comprising a fluid-like readily injectable suspension of the relatively water insoluble penicillin salt N,N'-dibenzylethylenediamine penicillin having a concentration of at least about 200,000 units per cc. in an aqueous vehicle containing a water soluble alkali metal penicillin salt dissolved therein, said relatively water insoluble salt of N,N'-dibenzylethylenediamine having a substantial proportion thereof of an average particle size of about 5 microns and said water soluble penicillin salt being present in a concentration of about 100,000 units per cc., said suspension having a viscosity substantially less than the viscosity of a suspension of the said insoluble penicillin salt in the said aqueous vehicle from which the said water soluble penicillin salt is excluded and being readily injectable through a standard 20-gauge hypodermic needle.

6. A therapeutic composition comprising a dry mixture of potassium penicillin G, procaine penicillin G and N,N'-dibenzylethylenediamine dipenicillin G, said mixture when reconstituted before use by the addition of sterile water forming a product suitable for use by injection and containing in each cc. about 100,000 units of the potassium penicillin, about 150,000 units of the procaine penicillin and at least about 150,000 units of the N,N'-dibenzylethylenediamine dipenicillin.

References Cited in the file of this patent

UNITED STATES PATENTS

| | | |
|---|---|---|
| 2,577,699 | Cooper | Dec. 4, 1951 |
| 2,585,239 | Granatek | Feb. 12, 1952 |
| 2,619,447 | Malcolm | Nov. 25, 1952 |

OTHER REFERENCES

Elias et al.: "N,N'-Dibenzylethylenediamine Penicillin," Antibiotics and Chemotherapy, vol. 1, November 1951, pp. 491–498.

"Penicillin S–R," J.A.P.A., Pract. Pharm. Ed., March 1949, p. 179.

"Bi-Pen," J.A.P.A., Pract. Pharm. Ed., May 1949, p. 269.

Seifter: "Toxicity of N,N'-Dibenzylethylenediamine . . .," Antibiotics and Chemotherapy, November 1951, pp. 504–508.

Janot: "Les penicillines a action prolongee," Anns. Pharm. Francs., 1950, pp. 46–61, esp. pp. 56–58.